United States Patent
Annamalai et al.

(10) Patent No.: US 8,987,155 B2
(45) Date of Patent: Mar. 24, 2015

(54) NIOBIUM DOPED SILICA TITANIA GLASS AND METHOD OF PREPARATION

(71) Applicant: Corning Incorporated, Corning, NY (US)

(72) Inventors: Sezhian Annamalai, Painted Post, NY (US); Steven Bruce Dawes, Corning, NY (US); Kenneth Edward Hrdina, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/973,428

(22) Filed: Aug. 22, 2013

(65) Prior Publication Data
US 2014/0066286 A1    Mar. 6, 2014

Related U.S. Application Data

(60) Provisional application No. 61/694,932, filed on Aug. 30, 2012.

(51) Int. Cl.
*C03C 3/06*      (2006.01)
*C03C 3/097*     (2006.01)
(Continued)

(52) U.S. Cl.
CPC . *C03C 3/097* (2013.01); *C03C 3/06* (2013.01); *C03C 3/076* (2013.01); *C03C 3/095* (2013.01);
(Continued)

(58) Field of Classification Search
CPC .................. C03C 2201/40; C03C 2201/42
USPC .......................................................... 501/54
See application file for complete search history.

(56) References Cited

U.S. PATENT DOCUMENTS 3,673,049 A *   6/1972   Giffen et al. ................. 428/213
3,785,722 A      1/1974   Schultz
(Continued)

FOREIGN PATENT DOCUMENTS

EP        0535388     7/1993
EP        1167308     7/2003
(Continued)

OTHER PUBLICATIONS

Ochoa et al; "Sol-Gel Preparation and Characterization of Niobia Thin Films for Catalytic Sensor Application"; Mat. Res. Soc. Symp. Proc. vol. 346 1994, pp. 553-558.
(Continued)

*Primary Examiner* — Noah Wiese
(74) *Attorney, Agent, or Firm* — Kevin L. Bray; Walter M. Douglas

(57) ABSTRACT

This disclosure is directed to a silica-titania-niobia glass and to a method for making the glass. The composition of the silica-titania-niobia ($SiO_2$—$TiO_2$—$Nb_2O_5$) glass, determined as the oxides, is $Nb_2O_5$ in an amount in the range of 0.005 wt. % to 1.2 wt. %, $TiO_2$ in an amount in the range of 5 wt. % to 10 wt. %, and the remainder of glass is $SiO_2$. In the method, the STN glass precursor is consolidated into a glass by heating to a temperature of 1600° C. to 1700° C. in flowing helium for 6 hours to 10 hours. When this temperature is reached, the helium flow can be replaced by argon for the remainder of the time. Subsequently the glass is cooled to approximately 1050° C., and then from 1050° C. to 700° C. followed by turning off the furnace and cooling the glass to room temperature at the natural cooling rate of the furnace.

12 Claims, 2 Drawing Sheets

(51) Int. Cl.
*C03C 3/076* (2006.01)
*C03C 3/095* (2006.01)
*C03C 4/00* (2006.01)
*C03B 19/12* (2006.01)

(52) U.S. Cl.
CPC ............... *C03C 4/0085* (2013.01); *C03B 19/12* (2013.01); *C03B 2201/23* (2013.01); *C03B 2201/42* (2013.01); *C03C 2201/23* (2013.01); *C03C 2201/42* (2013.01); *C03C 2203/34* (2013.01); *C03C 2203/42* (2013.01); *C03C 2203/50* (2013.01); *C03B 2201/075* (2013.01); *C03B 2201/40* (2013.01)
USPC .............................................. 501/54; 501/63

(56) References Cited

U.S. PATENT DOCUMENTS

| | | | |
|---|---|---|---|
| 3,801,294 | A | 4/1974 | Schultz et al. |
| 3,806,570 | A * | 4/1974 | Flamenbaum et al. ...... 264/1.21 |
| 4,680,048 | A | 7/1987 | Motoki et al. |
| 4,961,767 | A | 10/1990 | Schermerhorn et al. |
| 5,063,003 | A | 11/1991 | Gonzalez-Oliver |
| 5,175,199 | A | 12/1992 | Asano et al. |
| 6,032,487 | A * | 3/2000 | Kinoshita ....................... 65/17.2 |
| 6,209,357 | B1 | 4/2001 | Bhandarkar et al. |
| 6,832,493 | B2 | 12/2004 | Bowden et al. |
| 7,053,017 | B2 | 5/2006 | Hrdina et al. |
| 7,081,290 | B2 * | 7/2006 | Takahashi et al. ............ 428/156 |
| 7,155,936 | B2 | 1/2007 | Dawes et al. |
| 7,294,595 | B2 * | 11/2007 | Iwahashi et al. ................ 501/54 |
| RE40,586 | E | 11/2008 | Hrdina et al. |
| 7,585,598 | B2 * | 9/2009 | Maida et al. ...................... 430/5 |
| RE41,220 | E | 4/2010 | Davis, Jr. et al. |
| 2002/0059810 | A1 | 5/2002 | Borrelli et al. |
| 2004/0045318 | A1 | 3/2004 | Hrdina et al. |
| 2004/0250573 | A1 | 12/2004 | Hack et al. |
| 2005/0245382 | A1 | 11/2005 | Iwahashi et al. |
| 2006/0276323 | A1 | 12/2006 | Iwahashi et al. |
| 2011/0048075 | A1 | 3/2011 | Duran et al. |

FOREIGN PATENT DOCUMENTS

| | | |
|---|---|---|
| EP | 1215180 | 8/2004 |
| JP | 4002625 | 1/1992 |
| JP | 5058649 | 3/1993 |

OTHER PUBLICATIONS

Machine translation of JP4002625.
Machine translation of JP5058649.

* cited by examiner

NIOBIUM DOPED SILICA TITANIA GLASS AND METHOD OF PREPARATION

PRIORITY

This application claims the benefit of U.S. Provisional Patent Application Ser. No. 61/694,932, filed on Aug. 30, 2012, entitled "NIOBIUM DOPED SILICA TITANIA GLASS AND METHOD OF PREPARATION" in the name of Sezhian Annamalai et al., the contents of which are incorporated herein by reference.

FIELD

This disclosure is directed to silica-titania glasses, and in particular to a silica-titania glass that is further doped with niobium; and to a method for making the glass.

BACKGROUND

In the semiconductor manufacturing, progress is measured in terms of the industry's continued ability to adhere to Moore's Law, which states that the number of transistors on a chip doubles about every two years. The *International Technology Roadmap for Semiconductors* (ITRS) dictates expected performance specifications for chip manufacturing technology to ensure continued adherence to this law. Accomplishing these specifications in turn requires the development and perfection of new technologies at a pace that is unmatched by any other industry. Among the technical challenges facing the semiconductor industry, lithography presents some of the most formidable problems, particularly the search for a next generation lithography solution that can provide for high-volume manufacturing of computer chips at the 32 nm node and beyond.

Extreme Ultra-Violet Lithography (EUVL) is the leading candidate to succeed optical lithography at the currently used wavelength of 193 nm. EUVL uses a 13.5 nm radiation for forming the circuit pattern image with much higher resolution. This EUV radiation will be absorbed by all materials and hence conventional refractive optics cannot be employed for this lithography technique. Hence these EUVL systems have to use projection or reflective optics. These projection optics require a substrate, on which reflecting layers are applied to reflect the EUV radiation. The most critical requirement for these substrates is near zero (less than 10 parts per billion) thermal expansion properties at the operating temperature of the EUVL systems.

The EUVL scanners, which produce the integrated chips, are being produced in small scale to demonstrate this new technology and the optics systems are an important part of these scanners. Initially, glass ceramic materials were considered and tried for the optics system parts. Currently silica-titania glass, which exhibits a combination of good thermal expansion and an ability to be polished to low high spatial frequency roughness is being used for making the substrates for these optics and optical systems. The advantages of silica titania glass are polishability to the required finish, CTE (Coefficient of Thermal Expansion) control, dimensional stability and radiation stability. The specifications in the EUVL area are becoming more stringent for the newer optics systems, especially the tolerance for Tzc (zero crossover temperature), the expansivity slope (slope of the CTE vs. temperature curve) or temperature width in which the CTE is zero and Tzc spatial homogeneity. This application discloses a silica-titania glass having an additional dopant to further control the expansivity or the temperature width in which the CTE is zero and to a method of making such glass.

SUMMARY

This disclosure is directed to a silica-titania glass that is further doped with niobium to reduce the expansivity of the glass or to increase the temperature width in which the CTE is zero, and to control Tzc spatial homogeneity. The composition of the disclosed silica-titania-niobia ($SiO_2$—$TiO_2$—$Nb_2O_5$ or STN) glass, determined as the oxides, is $Nb_2O_5$ in an amount in the range of 0.005 wt. % to 1.2 wt. %, $TiO_2$ in an amount in the range of 5 wt. % to 10 wt. %, and the remainder of the glass is $SiO_2$. The STN glass has a lower expansivity slope than that of a silica-titania only glass having a substantially equivalent titania content. The term "substantially equivalent" as used herein is best understood by an example. Herein, it means that if the STN glass has a Ti content of 7.0 wt. %, its expansivity slope will be lower than that of a silica-titania glasses having a Ti content of 7.0±0.5 wt. %. For example, a STN glass having a reduced expansivity, or increased temperature width range, in which CTE is zero, the zero CTE range is 20 to 100° C.

The disclosure is also directed to a process for making a silica-titania-niobia glass by a new sol-gel based method. In the method the Nb dopant, in the form of an aqueous solution of $NbCl_5$ as disclosed herein, and a silica-titania soot are mixed in a solvent to form a slurry which is then gelled by adjusting its pH. This gelled material is carefully dried and consolidated to form the Nb doped silica-titania glass.

The disclosure is also directed to a silica-titania-niobia or STN glass comprising, in wt. % measured as the oxide, niobia in an amount in the range of 0.005 wt. % to 1.2 wt. %, titania in an amount in the range of 5 wt. % to 10 wt. %, and the remainder of the glass is silica, $SiO_2$. In an embodiment the niobia range is 0.1 wt. % to 1.0 wt. %, the titania is an amount in the range of 5 wt. % to 10 wt. %, and the remainder of the glass is silica, $SiO_2$.

The disclosure is further directed to a method for making a silica-titania-niobia glass having a composition comprising niobia in an amount in the range of 0.005 wt. % to 1.2 wt. %, titania in an amount in the range of 5 wt. % to 10 wt. %, and the remainder of the glass is silica, the method comprising the steps of:

obtaining a silica-titania soot have a titania content in the range of 5-10 wt. %;

preparing an aqueous hydroxide solution containing a selected amount of a niobium compound and adjusting the pH to above 12, and adding the silica-titania soot to the solution, the amount of the niobium compound in the solution being a silica-titania-niobia glass formed therefrom consists essentially of 0.005 wt. % to 1.2 wt. % niobia, 5 wt. % to 10 wt. % titania, and the remainder of the glass is silica;

mixing the resulting silica-titania soot containing solution for a time of 14-24 hours to form a stable sol, then reducing the pH to less than 10 by the addition of a time dependent buffering, gelling agent to form a gel, and degassing to remove entrapped air;

transferring the degassed sol to a closed container and aging the sol for a time in the range of 0.2 to 48 hours at a relative humidity of >75% to form a gel;

opening the container and allowing the gel to air dry for a time in the range of 4-8 days or until the weight of the gel is reduced to less than 70% of the weight of the starting gel;

drying the gel in an oven by slowly heating it to a temperature 100-150° C. for a time in the range of 20-30 hours to form a dried gel material;

slowly heating the dried gel material in a furnace to a temperature of 700-800° C. over a time in the range of 70 hours to 100 hours to slowly remove the organic binders present in the dried material without damaging the dried gel material and thereby forming a silica-titania-niobia glass precursor;

consolidating silica-titania-niobia glass precursor into a glass by heating the precursor to a selected temperature in the range of 1600° C. to 1700° C. in flowing helium over a time in the range of 4 hours to 24 hours, with the provision that the heating be at a rate exceeding 8° C./minute above 1535° C. to avoid crystallization in the glass; and cooling the consolidated glass from the consolidation temperature to room temperature.

In one embodiment, after the glass has been consolidated and before the glass is cooled to room temperature, the glass is annealed by lowering the temperature of the glass from the consolidation temperature to a temperature of 1000° C.±100° C. and holding the glass at this temperature for a time in the range of 1-2 hours followed by cooling the glass to a temperature of 750±50° C. at a rate less than 10° C. per hour before turning off the furnace and cooling the glass to room temperature at the natural cooling rate of the furnace.

In another aspect, after the glass is cooled and removed from the furnace, the glass is placed in an annealing oven and heated to 1000° C.±100° C. over a time in the range of 1-2 hours and held at 1000° C.±100° C. for a time in the range of 1-2 hours, followed by cooling to 750±50° C. at a rate less than 10° C. per hour before turning off the furnace and cooling the glass to room temperature at the natural cooling rate of the furnace.

In a further aspect, after the glass has been consolidated and before the glass is cooled and removed from the furnace, the fictive temperature of the glass is controlled by changing the annealing procedure prior to cooling by lowering the temperature from the consolidation temperature to 1100° C. and then to a selected temperature in the range of 700° C. to 900° C. at a rate of less than 2° C./minute; holding the glass at the selected temperature for a time in the range of 5 hours to 400 hours; cooling the glass to a temperature of at most 500° C. at an average cooling rate of at most 150° C./hr.; and turning off the heat to the furnace and allowing the furnace and glass therein to cool to room temperature at their natural rate. In one embodiment the average cooling rate is at most 50° C./hr. In another embodiment the average cooling rate is at most 10° C./hr.

The silica-titania-niobia glass according to this disclosure has a lower expansivity slope that is lower than the expansivity slope of a silica-titania glass having a substantially equivalent titania content. In an embodiment the silica-titania-niobia glass according to this disclosure has a lower expansivity than that of a silica-titania glass having an equivalent or substantially equivalent titania content. In addition, the absolute CTE of the STN glass is lower than that of the a silica-titania glass having a substantially equivalent titania content which can be changed by adjusting the titania content of the STN glass. This fact means that there are two independent variables, the niobia content and the titania content, that can be used to adjust the absolute CTE as well as the expansivity slope of the STN glass.

DETAILED DESCRIPTION

Figure 1:
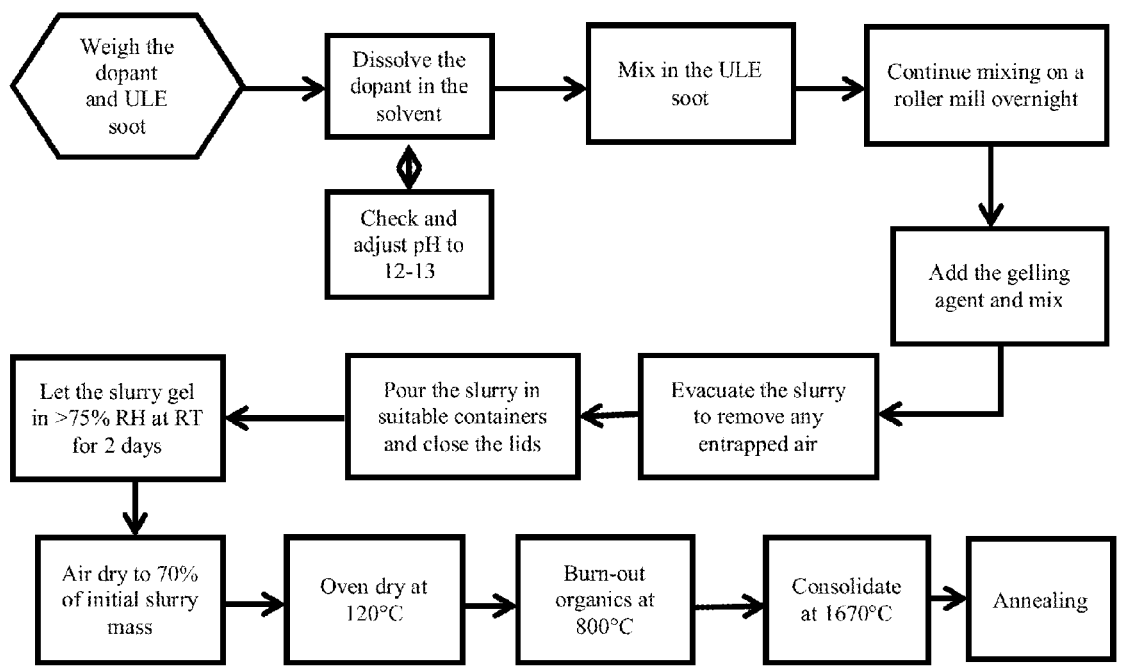
FIG. 1 is a schematic illustrating the steps in the method for making the silica-titania-niobia glass disclosed herein.

This disclosure describes a silica-titania-niobia glass and a sol-gel based method for making such glass. In this method a selected compound of Nb, for example without limitation $NbCl_5$, is dissolved in a selected solvent, for example, an aqueous solution of a quaternary ammonium hydroxide. In an embodiment the $NbCl_5$ be dissolved in an aqueous solution of a tetra alkyl ammonium hydroxide, for example tetramethyl ammonium hydroxide $(CH_3)_4NOH$. While low amounts of $NbCl_5$ (<0.25 wt. %) can easily be completely dissolved in the solvent, higher concentrations of the $NbCl_5$ salt require additional amounts of a concentrated version of the solvent. It is important to maintain the pH of the solution above 12.5 in order to enable the formation of a stable sol of the dissolved $NbCl_5$ and the silica-titania soot.

Once the $NbCl_5$ was completely dissolved in the solvent and the pH is adjusted to the preferred level, the silica-titania soot is added and thoroughly mixed into the $NbCl_5$ solution to for, a slurry for at least a time in the range of 12-24 hours. For example, the resultant slurry was slowly mixed overnight, approximately 12-16 hours, using a roller mill. A longer mixing time can also be used, for example without limitation, up to a time of 120 hour. The gelation was achieved by reducing the pH of the slurry using a buffering gelling agent, a pH reducing agent, for example without limitation 1-chloro-2-propanol or other buffering gelling agent, to bring the pH below 10, preferably close to the iso-electric point (IEP) of silica sol whose pH is approximately 9, for example, lowering the pH to the range of pH 8.7-9.3. In an example, 1-chloro-2-propanol as the buffering gelling agent was added in the required amount to achieve this pH reduction over a period of approximately 3 hours which helps in degassing the slurry by keeping it in a vacuum chamber to remove entrapped air and further handling of the slurry. The addition was done outside a vacuum chamber by pouring the slurry into a container, placing the open container into the vacuum chamber, and applying vacuum without any stirring. The vacuum was applied slowly to prevent spattering of the slurry from the container to the walls of the vacuum chamber. After outgassing, the container was removed from the vacuum chamber, closed and kept in an atmosphere containing a minimum 75% relative humidity at room temperature, 18-30° C., preferably 18-25° C., so that air circulation above the gel and/or dehydration of the gel is minimized.

After two days the container was opened and the gelled material was allowed to air dry for at least 5 days by which time the mass of the gelled material is reduced to less than 70% of the mass of the starting slurry. The material was then dried in an oven by heating it to a selected temperature in the range of 110-150° C. for a time in the range of 18-30 hours. The heating to the selected temperature was slowly carried out, for example by heating at a rate in the range of 2-20° C./hour, from the room's temperature to the maximum temperature in order to prevent cracking of the gelled material. For example, the material can be dried at 120° C. for a time of approximately 30 hours by heating the material from room temperature to 120° C. over a time of 24 hours and then holding the temperature at 120° C. for 2 hours or more. The dried material is then heated, at a rate in the range of 4° C. to 10° C./hour to a temperature in the range of 700-900° C. and held in this temperature range for a time in the range of 70 hours to 100 hours. For example. the dried material is to a temperature of approximately 800° C. and held for a time in the range of >0 hours to 2 hours, the heating being at a rate of <10° C./hour from the temperature of 120° C. to 550° C., and at the same or higher rate to 800° C., to remove the organic substances that are present in the dried sol-gel material without damaging the gelled material. After the organics have been thoroughly burnt out the resulting material is ready for consolidation into glass. The material is consolidated at a selected temperature in the range of 1600° C. to 1700° C. in flowing helium (He) for a time in the range of 5 hours to 15 hours. For example, the consolidation was carried out at a temperature of 1670±10° C. in flowing He for a time in the range of 7 hours to 10 hours. It is especially important that the heating be at a rate in the range of 10-20° C./minute above 1535° C. to avoid crystallization in the glass. Once the material reaches the selected temperature, for example 1670° C., the He flow can optionally be switched off and argon (Ar) is flowed through the consolidation chamber for the remainder of the consolidation time. This switching of the gas from He to Ar reduces and can substantially eliminate bubbles of He that may be trapped in the glass. The initial flow of He also serves to lower the OH content of the glass; for example to an OH content less than 500 ppm. In an embodiment the OH content is less than 200 ppm. In another embodiment the OH content is less than 100 ppm. In a further embodiment the OH content is in the range of 10-70 ppm. The switch to Ar is done because He, being a smaller atom, will more easily escape from the glass during consolidation than would Ar, a larger atom, if Ar were used during the entire consolidation process. The consolidated glass is annealed in flowing $N_2$. An exemplary annealing schedule is cooling from 1050° C. to 700° C. at a rate of 1 to 5° C./hour.

If the consolidation is carried out in air, a $O_2/N_2$ mixture, $N_2$ or Ar instead of helium, the OH level of the glass will typically be above 500 ppm. For example, the OH content can be in the range 800-1000 ppm. This OH level can be decreased to a lower value without the use of helium by dehydrating using a chlorine containing gas admixed with the air, a $O_2/N_2$ mixture, $N_2$ or Ar. In addition, if desired, the OH level can also be increased, for example up to approximately 2000 ppm, by adding steam (water vapor) to the gas or gases being used during consolidation.

Figure 2:
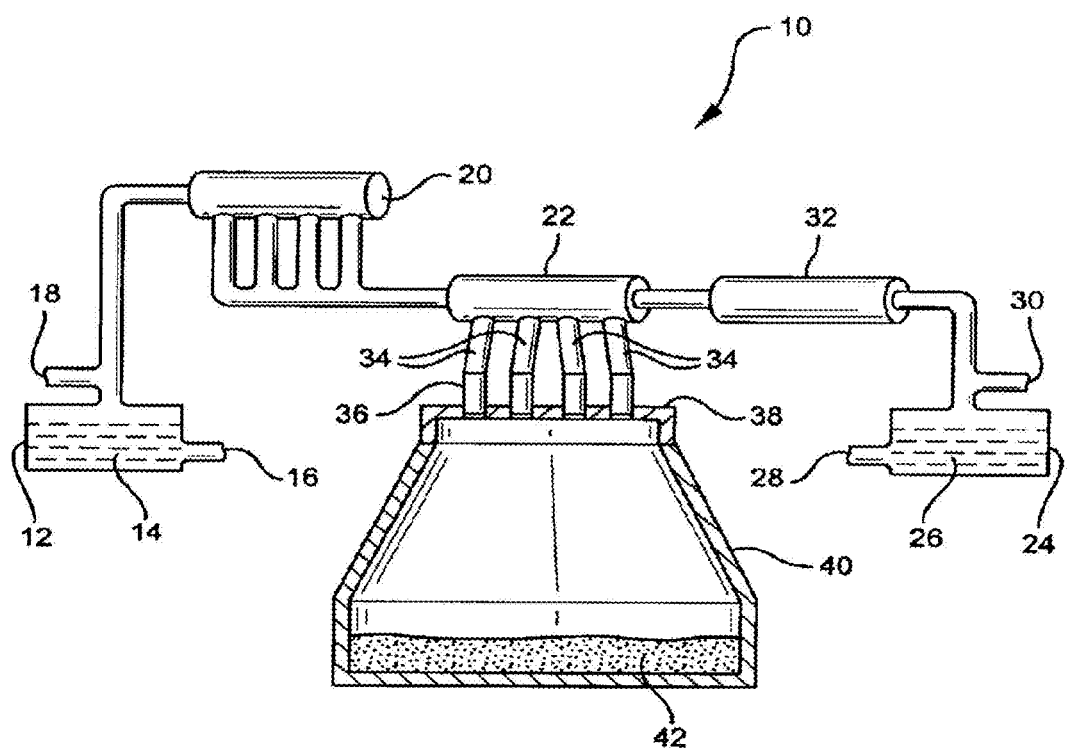
FIG. 2 is an exemplary system that can be used to make silica-titania soot.

The preparation of a silica-titania soot has been described in numerous patents and patent application. For example, U.S. Pat. No. 6,832,493 provides an exemplary method, and a system 10 as shown therein as FIG. 2 (shown as FIG. 2 in the present application), that can be used to prepare the soot. Briefly, the method for producing the soot includes a source of silica precursor 14, for example without limitation, octamethylcyclotetrasiloxane or $SiCl_4$. A carrier gas 16, such as nitrogen or helium, is introduced at or near the base of source 12. A bypass stream of carrier gas is introduced at 18 to prevent saturation of the vaporous stream. The vaporous stream passes through distribution system 20 to manifold 22. System 10 also includes source 24 of the titania precursor 26, for example without limitation, titanium tetrachloride or titanium tetraisopropoxide. The method can be used to produce silica-titania glasses contain 3-20 wt. % titania. In the present application the method can be used to produce a silica-titania glass containing 5-10 wt. % titania, and in one embodiment 6-8 wt. % titania. Further referring to FIG. 2, a source 24 also has inlet 28 for a carrier gas that is transmitted through precursor material 26. A by-pass stream is introduced at 30. The vaporous stream passes through distribution system 32 to manifold 22.

The silica vapor stream and the titania vapor stream mix in manifold 22. The mixture passes through fume lines 34 to burners 36 mounted in upper portion of furnace 38. The mixed vapor stream is further joined with a fuel/oxygen mixture at burners 36. The vapor stream combusts and is oxidized to form silica-titania particles at a temperature in excess of 1600° C. The particles cool and are directed into collection chamber 40. The resulting silica-titania soot can then be used to for addition to the niobium pentachloride slurry to prepare the silica-titania-niobia glass described herein. Alternatively, the silica and titania precursors can be mixed in the liquid state and vaporized together.

The niobium doping of the silica-titania glass reduces the CTE as well as the rate at which CTE changes with temperature which is the expansivity. The reduced expansivity along with an increased temperature width in which the CTE is zero, is an important and critical requirement of the a silica-titania glass for EUVL applications, for example without limitation, projection or reflective optics, and lithography mask substrates. An advantage of the sol-gel process is that it does not give rise to striae whereas in a soot-to-glass process, whether the soot is (a) first made into a preform, for example a boule, rod or plate, which is then consolidated into glass after the preform is made (the indirect process) or (b) collected in a vessel at consolidation temperatures as it formed and simultaneously or substantially simultaneously consolidated into glass (the direct process), striae are typically formed. A powder processing method such as a sol-gel eliminates or substantially eliminates this concern about striae formation.

While the above paragraph mentions that an advantage of the sol-gel process is that it does not gives rise to striae in the finished glass, a STN glass can also be made by "oxidizing" Si, Ti and Nb precursors in an oxygen containing flame using either the direct or indirect processes described. The challenge in this instance is the fact that many of the niobium precursors that would be used are air and/or moisture sensitive. Further, those that are liquids frequently decompose upon heating because of their high boiling point. However, air/moisture sensitive liquids such as $SiCl_4$ and $TiCl_4$ were long used to make silica-titania glasses.

Niobium pentachloride, $NbCl_5$, is soluble in alcohols, ethers and chloroform. As a result, it is possible to prepare a STN glass using a $NbCl_5$ solution as one of the feedstocks. U.S. Pat. No. 5,028,568 describes preparing a solution of $NbCl_5$ in anhydrous ethanol, and then adding titanium isopropoxide [$Ti(i=PrO)_4$] to the $NbCl_5$/ethanol solution. For example, using a method such as that described in U.S. Pat. No. 5,970,751 (Maxon et al.) silica, titania and niobia precursors are fed to a burner in the appropriate Si:Ti:Nb ratio and are combusted to form a STN soot. In the indirect process, the soot is collected in a vessel or on a bait, and, after the soot collection is completed, it is consolidated at consolidation temperatures, for example, at a temperature above 1600° C., to form a STN glass. In the direct process, the soot is consolidated as it is collected in a vessel. In the indirect process, the collected soot can also be subject to additional treatment, for example, dehydration using a suitable dehydrating gas such as $Cl_2$ or a chlorine containing gas, for example, $CCl_4$; hydrated to increase the OH content using steam; or further doped, for example by fluorine using a gaseous fluorinating agent, for example, $SiF_4$, $SF_4$.

Alternatively, instead of collecting the soot in a vessel, the soot can be deposited on a mandrel or bait using the VAD (vertical axial deposition) method to form a porous preform. The porous preform can also be dehydrated, hydrated or further doped as described above if desired. The preform is consolidated and removed from the mandrel or bait, and it is formed into a glass object.

Niobia will lower the CTE of fused silica, but not to zero levels. Fused silica has an average CTE of approximately 550 ppb/° C. over the temperature range 0-300° C. The addition of niobia to the fused silica glass will lower the CTE to approximately 470 ppb/° C. over the temperature range 0-300° C. In a sample made using $NbCl_5$ and $SiCl_4$ in an indirect process as described, with a target niobia content of 1.6 wt. %, the actual niobia content in the glass ranged from 1.6 wt. % to 6.9 wt. %. Without being held to any particular theory, it is believed that the niobia separated out during consolidation and was concentrated in the bottom of the sample. Silica-titania glass as presently made has an average CTE of approximately 0±10 ppb/° C. over the temperature range of 20-320° C. Over the temperature range of 20-320° C. niobia in a silica-titania glass will result in a similar reduction in CTE since the glass is predominantly a silica glass. Niobia also lowers the viscosity of the silica-titania glass. This feature is an advantage in controlling the CTE as well as the expansivity vs. temperature, and is also an advantage in adjusting the fictive temperature of a silica-titania-niobia glass. In addition, the sol-gel method is used to make a STN glass the niobia did not separate out during consolidation.

The Tzc of the resulting STN glass is also adjustable using the method described in U.S. patent application Ser. No. 12/856,728 which describes a "Photoelastic Method for the Absolute Determination of Zero CTE Crossover in Low Expansion Silica-titania Glass Samples" and U.S. application Ser. No. 12/868,394 which describes a method for "Tuning Tzc by the Annealing of Ultra Low Expansion Glass." The titania level in the glass is adjustable to obtain a desired $T_{ZC}$ (temperature at which CTE is zero) for each different Nb level and Tzc.

An further advantage of the sol-gel method is that it easier to make large number of doped glass parts without a large capital investment. The method described herein for making a STN glass ensures uniform distribution of the niobium dopant in the glass to a high degree which is critical for the Tzc spatial homogeneity in the glass parts. This method also offers the flexibility in the use of different concentration levels of the dopants, the use of different dopants, for example Ta, Yb, Al, B, K, F and Na, and use of a combination of dopants without additional equipment.

While two methods of annealing the obtained glass has been described above, there are other methods in the art that can be applied either directly after consolidation without cooling to below 500° C. or in a separate annealing step after STN glass has been cooled and removed from the furnace in which it was made. Such additional procedures are described in U.S. Patent Application Publications 2006/0179879, 2011/0043787, 2011/0207592 and 2007/0042893; U.S. Pat. No. 7,462,574; and European Patent No. 1 795 506.

In an embodiment the OH content of the STN glasses is less than 200 ppm. In another embodiment the OH concentration is less than 100 ppm. In a further embodiment the OH content is in the range 10-70 ppm. If it is desired to further dehydrate the silicon-titanium-niobium material after drying and removal of the organics and before consolidation, this can be done using chlorine or fluorine, or other gases such as $CF_4$ or $SiF_4$ as described in U.S. Pat. No. 8,047,023 and other patent documents. The dehydration using these gasses is preferably carried out in the presence of an inert gas such as helium. In addition, the glass can be fluorinated using the methods that are used to obtain F-doped silica glass and F-doped silica-titania glass.

In addition to the method described above, the disclosure is directed to a method for making a silica-titania-niobia glass having a composition comprising niobia in an amount in the range of 0.005 wt. % to 1.2 wt. %, titania in an amount in the range of 5 wt. % to 10 wt. %, and the remainder of the glass is silica, the method comprising the steps of:

preparing a silica-titania soot having a titania content in the range of 5 wt. % to 10 wt. % and the remainder being silica;

dissolving a selected amount of a niobium compound in an aqueous hydroxide solution, and adjusting the pH of the solution during and after salt dissolution so that the final pH of the niobium containing solution is in the range of 12.5-13, the amount of the niobium compound being dissolved such that the final glass consists essentially of niobia in an amount in the range of 0.005 wt. % to 1.2 wt. %, titania in an amount in the range of 5 wt. % to 10 wt. %, and the remainder of the glass is silica adding the silica-titania soot to the niobium containing solution and mixing the resulting mixture for a time in the range of 14-24 hours to form a stable sol; reducing the pH of the sol to close to the iso-electric point of a silica sol, which is approximately pH 9 by the addition of a buffering, gelling agent to form a gel;

degassing, by reducing the pressure by about 100 kPa, the sol to remove entrapped air in a vacuum chamber transferring the sol to a suitable container, closing the container and aging the gel in the container at room temperature and at a relative humidity of >75% for a time 0.2 to 48 hours;

opening the container and allowing the gel to air dry for a time in the range of 4-8 days or until the weight of the gel is reduced to less than 70% of the starting gel;

drying the gel in an oven heating it to a temperature in the range of 110-150° C. for a time in the range of 20 hours to 30 hours to form a dried gel material;

heating the dried gel material in a furnace to a temperature of approximately 800° C. for a time in the range of 70 hours to 100 hours to slowly remove the organic binders present in the dried material without damaging the dried gel material and thereby forming a silica-titania-niobia glass precursor;

consolidating silica-titania-niobia glass precursor into a glass by heating the precursor to a selected temperature in the range of 1600° C. to 1700° C., or in an embodiment from 1650° C. to 1700° C., in flowing helium (He) for a time in the range of 6 hours to 10 hours and when the material reaches the selected temperature the He flow is switched off and argon (Ar) is flowed through for the remainder of the consolidation time to thereby form a silica-titania-niobia glass; and cooling the consolidated glass from the consolidation temperature to approximately 1050° C. at a rate in the range of 5° C. to 20° C. per minute and then from 1050° C. to 700° C. at a rate in the range of 1° C. to 10° C./hour followed by turning off the furnace and cooling the glass to room temperature at the natural cooling rate of the furnace and removing the glass from the furnace.

In the method of the preceding paragraph, after the glass has been consolidated and before the glass is cooled to room temperature the glass is annealed. In this embodiment the temperature of the glass is lowered from the consolidation temperature to a temperature of 1050° C.±25° C. and held at this temperature for a time in the range of 1-2 hours followed by cooling to a 700° C. at a rate in the range of 1° C. to 10° C. per hour before turning off the furnace and cooling the glass to room temperature at the natural cooling rate of the furnace.

In another embodiment, after the cooled glass is removed from the furnace, the glass is placed in an annealing oven and heated to 1050° C.±25° C. in 1-2 hours and held at 1050° C.±25° C. for a time in the range of 1-2 hours followed by cooling to 700° C. at a rate in the range of 1° C. to 10° C. per hour before turning off the furnace and cooling the glass to room temperature at the natural cooling rate of the furnace.

In an additional embodiment, after the STN glass has been consolidated, but before the glass is cooled and removed from the furnace, the fictive temperature of the glass is controlled by changing the annealing procedure prior to cooling. This involves changing the annealing temperature and the cooling rate down from the annealing temperature to lower temperatures. This is accomplished by lowering the temperature from the consolidation temperature—to a selected temperature of in the range of 700° C. to at most 1200° C. and holding the glass at the selected temperature for a time in the range of 5 hours to 400 hours, and then cooling the STN glass to a temperature of at most 500° C. at an average cooling rate of at most 150° C./hr. In an embodiment the average cooling rate is at most 100° C./hr. In another embodiment the average cooling rate is at most 50° C./hr. In a further embodiment the average cooling rate is at most 10° C./hr. In an additional embodiment the average cooling rate is at most 5° C./hr. After the glass has reached 500° C. the heat to the furnace can be turned off and the furnace and glass within allowed to cool at the natural cooling rate of the furnace.

In a further embodiment, the fictive temperature of a cooled STN glass is shifted by the use of a selected annealing cycle of the glass. For example, after the cooled STN glass is removed from the furnace, the glass is placed in an annealing oven and heated to a selected temperature of in the range of 700° C. to at most 1200° C. for a time in the range of 5 hours to 400 hours, and then the STN glass is cooled to a temperature of at most 500° C. at an average cooling rate of at most 150° C./hr. In an embodiment the average cooling rate is at most 100° C./hr. In another embodiment the average cooling rate is at most 50° C./hr. In a further embodiment the average cooling rate is at most 10° C./hr. In an additional embodiment the average cooling rate is at most 5° C./hr. After the glass has reached 500° C. the heat to the furnace can be turned off and the furnace and glass within allowed to cool at the natural cooling rate of the furnace.

While the invention has been described with respect to a limited number of embodiments for the purpose of illustration, those skilled in the art, having benefit of this disclosure, will appreciate that other embodiments can be devised which do not depart from the scope of the invention as disclosed herein. Accordingly, various modifications, adaptations and alternatives may occur to one skilled in the art without departing from the spirit and scope of the present disclosure.

We claim:

1. A silica-titania-niobia glass comprising, in wt., % measured as the oxides, niobia in an amount in the range of 0.005 wt. % to 1.2 wt. %, titania in an amount in the range of 5 wt. % to 10 wt. %, and the remainder of the glass is silica, $SiO_2$.

2. The silica-titania-niobia glass according to claim 1, wherein the titania content is in the range of 6 wt. % to 9 wt. %.

3. The silica-titania-niobia glass according to claim 1, wherein the silica-titania-niobia has a lower expansivity slope than that of a silica-titania glass having a substantially equivalent titania content.

4. The silica-titania-niobia glass according to claim 1, wherein the OH content of the glass is less than 200 ppm.

5. The silica-titania-niobia glass according to claim 1, wherein the OH content of the glass is less than 100 ppm.

6. The silica-titania-niobia glass according to claim 1, wherein the OH content of the glass is in the range of 10-70 ppm.

7. A method for making a silica-titania-niobia glass having a composition comprising niobia in an amount in the range of 0.005 wt. % to 1.2 wt. %, titania in an amount in the range of 5 wt. % to 10 wt. %, and the remainder of the glass is silica, the method comprising the steps of:

obtaining a silica-titania soot have a titania content in the range of 5-10 wt., % preparing an aqueous hydroxide solution containing a selected amount of a niobium compound and adjusting the pH to above 12, and adding the silica-titania soot to the solution, the amount of the niobium compound in the solution being such that a silica-titania-niobia glass formed therefrom consists essentially of 0.005 wt. % to 1.2 wt. % niobia, 5 wt. % to 10 wt. % titania, and the remainder of the glass is silica, mixing the resulting silica-titania soot containing solution for a time of 14-24 hours to form a stable sol, then reducing the pH to less than 10 by the addition of a time dependent buffering, gelling agent to form a gel, and degassing to remove entrapped air;

transferring the degassed sol to a partially-closed container and aging the sol 0.2 to 48 hours at a relative humidity of >75% to form a gel;

opening the container and allowing the gel to air dry for a time in the range of 4-8 days or until the weight of the gel is reduced to less than 70% of the weight of the starting gel;

drying the gel in an oven by slowly heating it to a temperature 100-150° C. for a time in the range of 20-30 hours to form a dried gel material;

slowly heating the dried gel material in a furnace to a temperature of 700-800° C. over a time in the range of 70 hours to 100 hours to slowly remove the organic binders present in the dried material without damaging the dried gel material and thereby forming a silica-titania-niobia glass precursor;

consolidating silica-titania-niobia glass precursor into a glass by heating the precursor to a selected temperature in the range of 1600° C. to 1700° C. in flowing helium over a time in the range of 4 hours to 24 hours, with the provision that the heating be at a rate exceeding 8° C./minute above 1535° C. to avoid crystallization in the glass; and cooling the consolidated glass from the consolidation temperature to room temperature.

8. The method according to claim 7 wherein after the glass has been consolidated and before the glass is cooled to room temperature, the glass is annealed by lowering the temperature of the glass from the consolidation temperature to a temperature of 1000° C.±100° C. and holding the glass at this temperature for a time in the range of 1-2 hours followed by cooling the glass to a temperature of 750±50° C. at a rate in the range of 1° C. to 10° C. per hour before turning off the furnace and cooling the glass to room temperature at the natural cooling rate of the furnace.

9. The method according to claim 7, wherein after the glass is cooled and removed from the furnace, the glass is placed in an annealing oven and heated to 1000° C.±100° C. over a time in the range of 1-2 hours and held at 1000° C.±100° C. for a time in the range of 1-2 hours, followed by cooling to 750±50° C. at a rate in the range of 1° C. to 10° C. per hour before turning off the furnace and cooling the glass to room temperature at the natural cooling rate of the furnace.

10. The method according to claim 7, wherein after the glass has been consolidated and before the glass is cooled and removed from the furnace, the fictive temperature of the glass is controlled by changing the annealing procedure prior to cooling by:

lowering the temperature from the consolidation temperature to 1100° C. and then cooling to a selected temperature of in the range of 700° C. to 900° C. at a rate of less than 2° C./minute;

holding the glass at the selected temperature for a time in the range of 5 hours to 400 hours; and cooling the glass to a temperature of at most 500° C. at an average cooling rate of at most 150° C./hr.; and turning off the heat to the furnace and allowing the furnace and glass therein to cool to room temperature at their natural rate.

11. The method according to claim 10, wherein the average cooling rate is at most 50° C./hr.

12. The method according to claim 10, wherein the average cooling rate is at most 10° C./hr.

* * * * *